United States Patent [19]
Zelten

[11] Patent Number: 5,652,663
[45] Date of Patent: Jul. 29, 1997

[54] PREVIEW BUFFER FOR ELECTRONIC SCANNER

[75] Inventor: James Peter Zelten, Melrose, Mass.

[73] Assignee: Polaroid Corporation, Cambridge, Mass.

[21] Appl. No.: 282,720

[22] Filed: Jul. 29, 1994

[51] Int. Cl.⁶ .............. H04N 1/40; H04N 1/387; H04N 1/46
[52] U.S. Cl. .............. 358/447; 358/448; 358/452; 358/537
[58] Field of Search .............. 358/447, 448, 358/452, 456, 458, 527, 531, 532, 537, 461; 382/254, 274

[56] References Cited

U.S. PATENT DOCUMENTS

| | | | |
|---|---|---|---|
| 4,610,536 | 9/1986 | Smyth et al. | 355/38 |
| 4,656,525 | 4/1987 | Norris | 358/537 |
| 4,724,477 | 2/1988 | Ellis et al. | 358/532 |
| 4,829,370 | 5/1989 | Mayne et al. | 358/537 |
| 4,912,537 | 3/1990 | Boyd | 250/578.1 |
| 4,941,038 | 7/1990 | Walowit | 358/518 |
| 4,980,759 | 12/1990 | Smyth | 358/504 |
| 5,027,196 | 6/1991 | Ono et al. | 358/527 |
| 5,075,770 | 12/1991 | Smyth | 358/505 |
| 5,103,322 | 4/1992 | Beck et al. | 358/496 |
| 5,276,511 | 1/1994 | Takemoto | 358/448 |
| 5,280,348 | 1/1994 | Honma et al. | 358/500 |
| 5,283,671 | 2/1994 | Stewart et al. | 358/532 |
| 5,303,064 | 4/1994 | Johnson et al. | 358/406 |

FOREIGN PATENT DOCUMENTS

| | | | |
|---|---|---|---|
| 0416654 | 3/1991 | European Pat. Off. | H04N 1/46 |
| 0514746 | 11/1992 | European Pat. Off. | H04N 1/46 |
| WO92/05469 | 4/1992 | WIPO | G03B 27/53 |

*Primary Examiner*—Kim Vu
*Assistant Examiner*—Kimberly A. Williams
*Attorney, Agent, or Firm*—Christopher P. Ricci

[57] ABSTRACT

The invention provides an apparatus for enhancing full color images and may be used within a variety of computer peripheral devices such as a scanner which scans images initially recorded on a photographic medium, for example. The invention takes image data and applies a programmable set of parameters to the image data which govern color saturation and sharpness, inter alia. The image is then passed to a computer where a user may alter the parameter. The parameters are passed back to be reprocessed within the scanner and an updated image is then sent back the computer in real time.

3 Claims, 2 Drawing Sheets

PREVIEW BUFFER FOR ELECTRONIC SCANNER

BACKGROUND OF THE INVENTION

The present invention relates generally to the computer enhanced imaging. More particularly it relates to a method and apparatus for editing a full-color image so that input data relating to an original color image is processed in such a manner that an observer of the output image will perceive a desired correspondence of image parameters between the two images.

The actual or perceived quality of an imaging system depends to a large extent upon a degree to which the output image, whether printed or electronically displayed, appears to match the input image or subject. In the case of a color image reproduction system, such as a scanner, wherein an input color image is copied to produce an output color image, the match between input and output extends to the color content of the image as well as the achromatic subject information. Thus the various shades and intensities of the different colors must be properly matched. Ideally, the colors of the output image should be indistinguishable from those of the input image.

Alternatively, a user may choose to purposely alter color and sharpness from that of the original image in order to accentuate aspects of the image or for various other reasons.

In order to accommodate such image changes in image scanning systems a pre-scan is used to bring image data to a central processing unit, such as a personal computer connected to the scanner, wherein software is running which allows a user to adjust color and hue information of the image.

There are many commercially available scanning systems which use one dimensional video lookup tables to change a limited number of variables in the image to immediately show a user a simulated version of what the image will look like a final scan. By doing so, the software makes use of the actual video device's lookup tables without accessing the actual color data read in from the scanner. While this does save some time, it is a simulation and provides an extremely limited number of variables that may be changed and the color and hue representation of the simulation can and often is off by a significant amount. In either case a user generally wishes to have editing ability of a full color image.

A second problem arises in scanning systems which require a re-scan in order to accurately update an output image to reflect changes to color or sharpness dictated by a user. Not only is re-scanning time consuming to recapture an image and reprocess electronic data resulting from the scan, but also such a requirement stops the user from being able to take out the subject to do side-by-side comparisons. In the case of slides, it is often desirable to be able to place the slide on a light table next to a host computer so that results of the scan can be displayed on the computer and a direct comparison.

A further problem arises in scanners which perform processing and image adjustment calculations at the same byte length as will be transmitted to the host, or alternatively convert to a lower byte length prematurely. If a scanner processes image data in eight bit bytes, for example, the processed data will have a lower tonal resolution due to accumulation of calculation errors. This phenomenon is known as "contouring." To a lesser extent, this also occurs if processing is performed at ten bit bytes and is then converted to eight bits before certain processing occurs, color enhancement for example.

Therefore, it is an object of the invention to provide an editing system for full color images which provides accurate representation of colors and hues of the image.

It is another object of the invention to allow a user to remove the input image, such as a color slide, from the scanner for comparison purposes while performing image enhancement of an image of the subject.

It is a further object of the invention to increase tonal resolution of the output image and maintain data precision by performing substantially all processing at a byte length greater than required by the host.

These and other object of the inventions will become apparent and will appear hereinafter.

SUMMARY OF THE INVENTION

The aforementioned and other objects are achieved by the invention which provides an apparatus for enhancing full color images. The invention is useful within a variety of computer peripheral devices such as scanners which scan images initially recorded on a transmissive photographic medium, for example. The invention comprises photoresponsive means, signal processing means, buffer means, image enhancing means, and interface means.

The photoresponsive means reads the color image from the photographic medium and translates the optical information into electronic image data representative of the color image. An example of such a device is a charge coupled device ("CCD").

The image data is transmitted to the signal processing means for processing the image data to correct for gain and darkness uniformity. The corrected image data is then placed into the buffer means.

The buffer means stores the image data in a raw form. This is accomplished using random access memory in the preferred embodiment.

The image enhancing means reads the contents of the buffer means as input to which it applies programmable image enhancing parameters. The programmable image enhancing parameters dictate how colors and sharpness are to be interpreted in the image to create a processed image.

The interface means is in electrical communication with the image enhancing means for displaying the processed image to the user. The user, after observing the display, may choose to alter the processed image by changing the programmable image enhancing parameters. After each change, the programmable image enhancing parameters are transmitted back through the image enhancing means to cause an update to the processed image which is once again displayed. This cycle continues until the user has the image in a desired form.

A final scan is then performed on the input image recorded on the photographic medium. The final scan reads the photographic medium at a higher resolution than the preview scans and applies the programmable image enhancing parameters which were dictated and verified on a preview image by the user. The results are displayed to the user on the computer display for further editing, storage, viewing, or outputting to a printer or other output device connected to a host computer.

In other aspects, the invention provides methods in accord with the apparatus described above. The aforementioned and other aspects of the invention are evident in the drawings and in the description that follows.

BRIEF DESCRIPTION OF THE DRAWINGS

The foregoing and other objects of the invention, the various features thereof, as well as the invention itself may be more fully understood from the following description when read together with the accompanying drawings in which.

DETAILED DESCRIPTION OF THE DRAWINGS

While the present invention retains utility within a wide variety of image enhancing systems and may be embodied in several different forms, it is advantageously employed in connection with a scanner of photographic medium. Though this is the form of the preferred embodiment and will be described as such, this embodiment should be considered illustrative and not restrictive.

Figure 1:
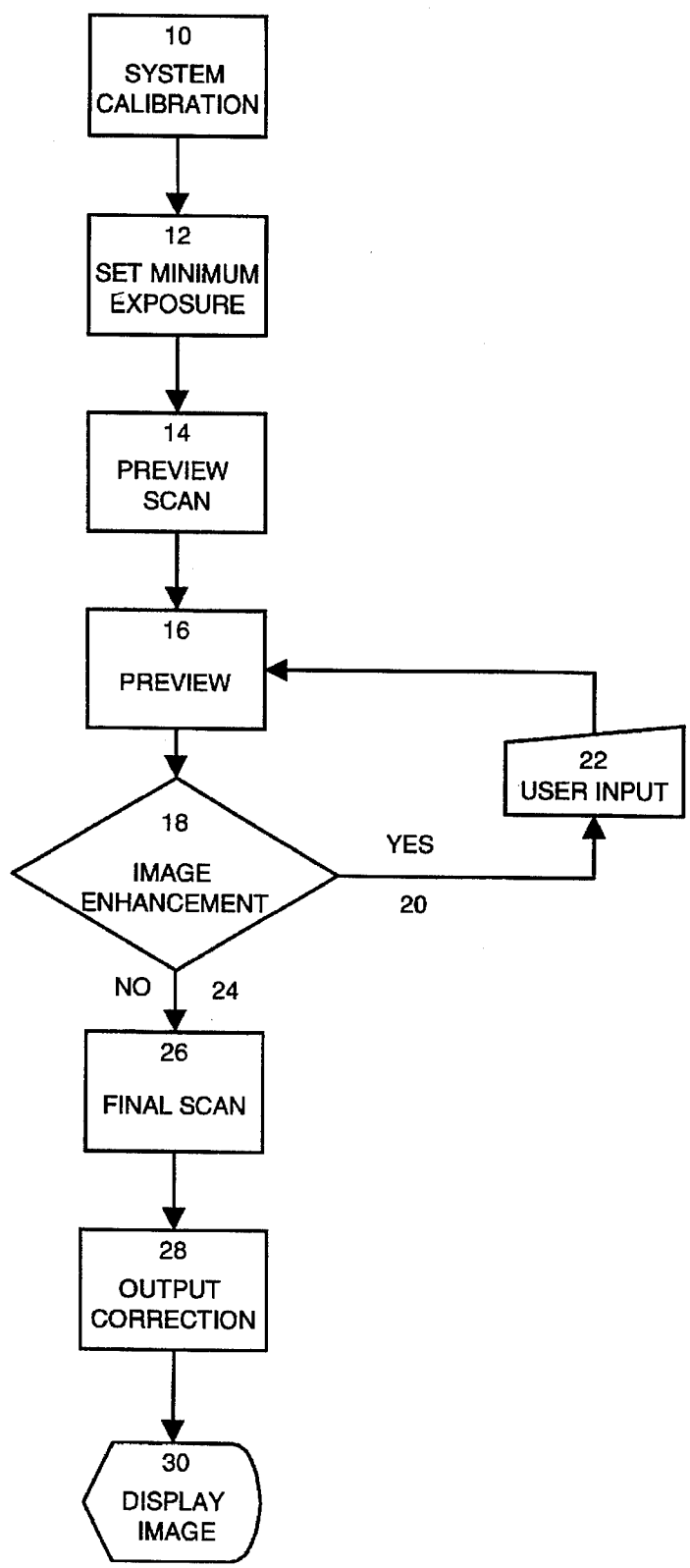
FIG. 1 is a flow chart illustrating the decision making process as followed by the invention.

FIG. 1 illustrates a flow chart of a typical scanning device employing the decision making process of the invention. The scanning device, which is adapted to be connected to a host computer, begins by performing a system calibration 10. Since the scanning device typically illuminates a subject to be scanned, a photographic medium for example though any printed material could be substituted, and quantifies the light reflected/transmitted in order to form an electronic image, the step of system calibration 10 has a desired effect of providing a reference target for dark uniformity correction by closing a shutter to block substantially all light. In the preferred embodiment, clear window is scanned to serve as a reference target for gain uniformity correction by calibrating through a perfectly uniform and stable transmissive medium—air. For reflective subject, a reflective target would be substituted.

Next, the scanning device determines a minimum exposure 12 required to properly read the subject. This step is scanner specific and may also be considered a calibration step. The minimum exposure 12 is determined in the preferred embodiment by activating an illumination device and reading variables such as light intensity and background color of the subject being scanned. An example of the latter is a substantially clear background representing the color white in a slide versus an organge-ish background color representing the color white in a negative. The minimum exposure step 12 includes reading such information and calibrating the scanner accordingly.

The subject is then scanned during step 14 to create electronic image data which is passed to the computer system to preview the image. The preview scan 14 is generally performed at a low resolution, typically 300–600 pixels per dimension of the medium, height and width, for example a 512×512 pixel image. By performing the preview scan 14 at a low resolution, sufficient data is read into the computer to provide a medium quality image on most computer monitors allowing a user to view the image for proper image enhancement. Performing this step at low resolution allows the scanner to operate at a high speed thus reducing wait time for the user. The low resolution preview is stored within the scanner to allow repeated re-processing with necessitating additional scans of the subject.

The image data is then previewed 16 by painting the image onto a computer monitor or other form of display. Once on the screen in a preview form, the user has an opportunity to choose to enhance the image by performing sharpening and color correction such as hue and saturation changes in the image.

A decision of whether to enhance the image is shown in block 18. If the user chooses to enhance the image, a "yes" is depicted at line 20 which represents that the user is manually changing processing parameters of the image.

The user performs the step of manual input at block 22. The user input is generally performed by allowing the user individual color density changes, tone scale adjustments as well as inter-color hue and color saturation adjustments. These changes may be performed by numerically changing the saturation and density or by graphically doing so by using a cursor on the screen to choose from a color palette or a sliding scroll bar. The user may also change sharpness settings which will be described in more detail hereinafter. The changes are then fed back into the preview step 16 at which time the changes are applied to the raw data from the low resolution scan. The image is then placed back up on the computer monitor for further enhancements.

This cycle is performed repetitively until the user decides that no additional image enhancement is necessary, this decision being indicated as "No" at 24. The image enhancements being complete, a final scan 26 is performed at the desired resolution.

The scanner in the preferred embodiment has a maximum dots per inch resolution of 2700 dots per inch. Therefore the image enhancements that have taken place very quickly in the above low resolution loop can now be applied in the final scan 26 to a much higher resolution which may take a longer period of time to acquire.

The image enhancements are applied at the output correction 28 where the image enhancements from the low-resolution scan are used to process the new higher resolution scan data to create the final display image 30.

Figure 2:
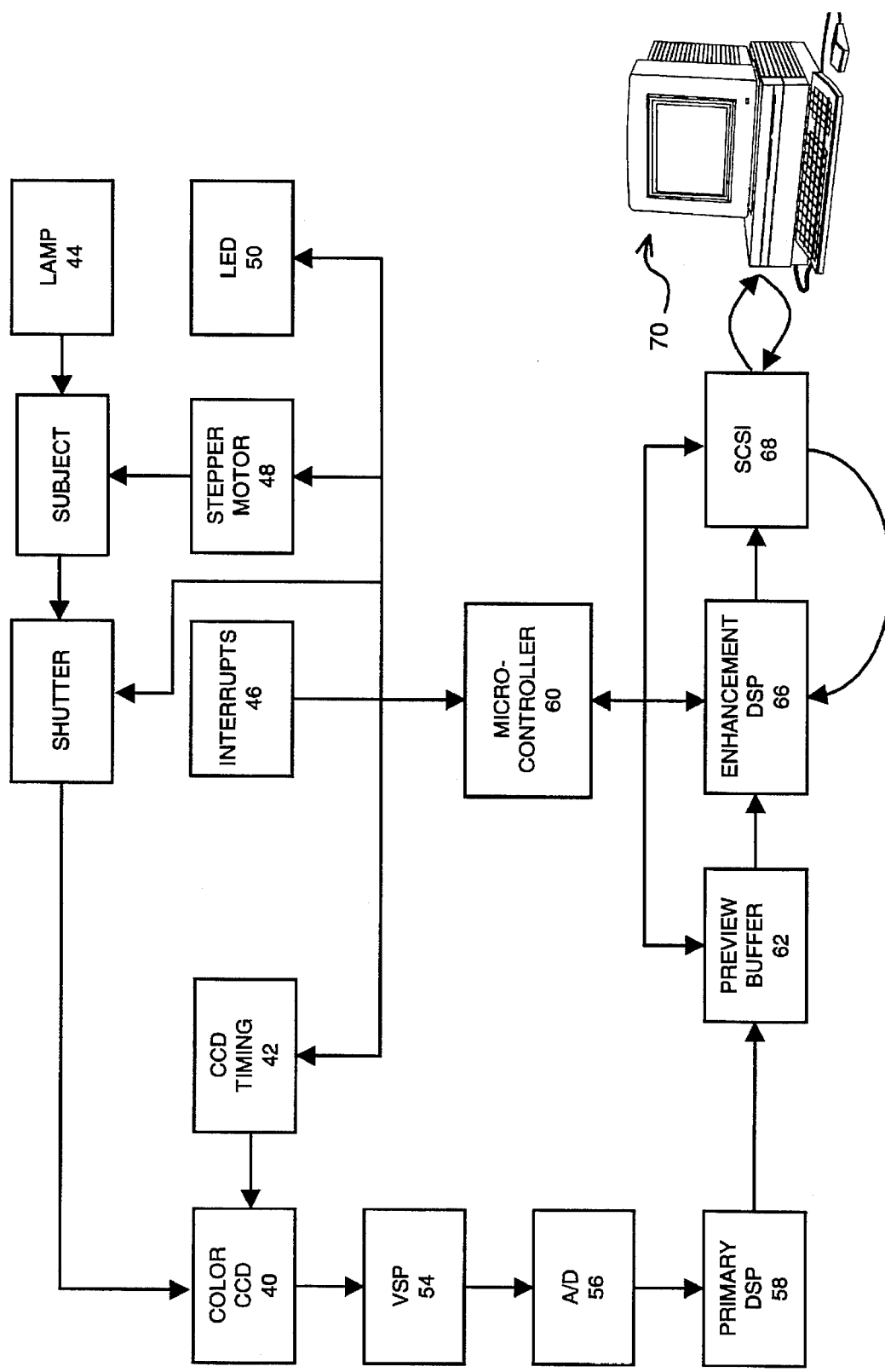
FIG. 2 is a data flow diagram showing a typical data flow in an apparatus employing the invention as illustrated in FIG. 1.

FIG. 2 shows electrical circuitry connected to elements of the scanner as previously described. In the center of FIG. 2 is shown a microcontroller 60. The microcontroller 60 is the central processing device for the scanner which dictates timing and coordinates data between devices. Though a microcontroller is used in the preferred embodiment, a microprocessor or other programmable logic devices may be substituted without detriment to the invention.

The top two rows of FIG. 2 represent a scanning scheme for optically reading an image. A scanner employing the scheme is shown in commonly assigned U.S. Pat. No. 5,075,770 entitled "Color Balanced Image Detector System" by William K. Smyth, and is incorporated herein by reference.

The scanning scheme utilizes a charge coupled display ("CCD") color detector assembly 40, a lamp 44, interrupt 46, and a stepper motor 48. The microcontroller controls the timing of the CCD 42 and the speed of the stepper motor 48 as a function of the resolution of the scan as requested by the user.

Resolution control is attained in one dimension by advancing the subject a greater distance between successive line scans and by advancing a charge in the CCD at a higher rate proportional to the increase in scanning speed. Resolution in a direction transverse to the direction of movement of the subject can be reduced by averaging, interpolating, or skipping over adjacent cells of the CCD registers (not shown) contained in the CCD 40, or a combination thereof. By averaging pairs of the cells the resolution is cut in half. This permits resolution to be selected in accordance with needs of the user of the image system.

Control of motion of the subject is accomplished in accordance with the following procedure. The interrupt 46 indicates that the subject is in a home position. Upon activation, the microcontroller 60 activates the stepper motor 48 in a forward direction for advancing the subject.

The forward driving of the motor draws the subject into the scanner. The microcontroller 60 then activates the timing unit 42 to operate the CCD registers of the assembly 40 and to conduct the image operations. Red, green, and blue multiplexed output signals coming out of the color CCD 40 as an electronic representation of the subject.

Once complete, the subject is returned back to the home position at which time the subject extends from a port in the scanner.

The output signals are then passed through to imaging circuitry to refine the image. The imaging operations include signal processing by primary digital signal processor ("DSP") 58 and enhancement DSP 66. Operations of the DSP's 58 and 66 are directed by the microcontroller 60

A light emitting diode ("LED") 50 is located on a front side of the scanner and the microcontroller 60 operates the LED 50 to illuminate when the system is ready to receive the subject, the LED 50 being off during scanning of the subject. The microcontroller 60 causes the LED 50 to blink if an error occurs in the scanning process.

The lamp 44 in the preformed embodiment is fluorescent. Optionally, the lamp 44 may include a halogen gas activated by a tungsten filament and may include an infrared filter to prevent excessive heating of the subject.

Image data as discerned by the CCD 40 is then passed as an analog signal on to a video signal processor ("VSP") 54. The VSP 54 performs analog signal conditioning and processing to correct exposure and color balance. Doing such processing in the analog domain reduces a need for interpolation between discrete points thereby decreasing error.

The output of the video signal processor 54 is then applied to an analog to digital ("A/D") converter 56 to convert the signal from the continuous-time domain to the discrete-time domain. The A/D converter 56 provides for a ten bit digital signal which is then passed to a primary digital signal processor 58.

The primary digital signal processor 58 performs a one pass primary correction to normalize dark to light response and to perform gain uniformity correction. In this way, the primary DSP 58 corrects for non-uniformities in CCD response across the field, illumination variations across the field, fine tuning of color balance as well as adjustment of resolution.

The corrected data from the primary digital signal processor 58 is then placed in a preview buffer 62 which stores the ten bit data in a raw form. In the preferred embodiment, the preview buffer comprises dynamic random access memory ("DRAM") though any of many electronic storage devices may be substituted without detriment to the invention.

The contents of the preview buffer 62 are then applied to an enhancement digital signal processor ("DSP") 66. The enhancement DSP 66 performs two-scale adjustments, i.e. color correction and adaptive sharpening to the image according to a preset combination of user selectable/ adjustable parameters.

The preset parameters are down-loaded from the host computer 70 upon power-up of the scanner and adjustable by the user thereafter as later herein described. Each time the scanner acquires a different image, the enhancement DSP 66 again receives the preset parameters from the host. This is in slight contrast to the primary DSP 58 which receives its parameters during self-calibration of the scanner and only again if another calibration is performed.

Color enhancement is performed by accessing a three-dimensional color processor which is programmed to convert Red-Green-Blue data as perceived by the CCD to a standard Red/Green/Blue color space or an appropriate 3-D color space for display or printing.

At this point after all processing other than sharpness is complete, the digital signal is converted to eight bit bytes for communication to the host computer. In the preferred embodiment the sharpening algorithm prefers the use of eight bit bytes and as minimal precision is lost for sharpening, the conversion is done before sharpening.

The sharpness enhancement is performed by using statistics to determine flat surfaces, edges and noise. Then, according to the degree of enhancement, the edges are sharpened and the noise is filtered.

In the preferred embodiment, both the primary and the enhancement DSP's are application specific integrated circuits ("ASIC") programmed to perform the described functions, though other logic processing devices may be substituted without detriment to the invention.

The enhanced data is then outputted via a small computer system interface ("SCSI") 68 which is connected to the host computer 70. Other interfaces such as RS-232 for example may also be used but SCSI is faster and has a robust command set that make this interface the preferred method. SCSI is suitable for outputting data to certain computers, such as the personal computer 70 shown, employing such interface. The computer 70 projects the enhanced image onto a monitor for display.

Along with the enhanced image the computer displays a menus driven command set which allows the user to manipulate the parameters applied by the enhancement DSP 66. Choosing to change color saturation, for example, is performed by choosing "Color" from the "Edit" menu which brings up a dialog box. The user may then change, for example, the saturation of all three colors, i.e. red, green and blue, or may change individual color saturation.

After each change, the new parameters are transmitted back to the scanner via the SCSI 68. Once in the scanner, the enhancement DSP 66 retrieves a fresh copy of the raw data stored in the preview buffer 62 and applies the new set of parameters. The new enhanced image is then sent back to the computer 70 to be displayed and revised as necessary by the user.

The changes to the image are performed in real-time and updated on the screen almost instantaneously. This is accomplished by using the original first pass scan of relatively low resolution which can be manipulated quickly and efficiently. The first pass scan is stored in the preview buffer to be re-processed immediately upon demand without a need for additional scanning. The original may even be removed from the scanner for direct comparison as the user adjusts the processing parameters. In this way the first pass scan which is done while the user waits is fast and places an image onto the computer monitor quickly and with a resolution comparable to that of many of the most popular monitors.

With this low resolution image the user performs image enhancements which are readily transferable to a high definition image. In other words, the lower resolution has only a nominal effect on the user's ability to attain optimum color and definition in the image. Since the adjustments to the processing are re-previewed on the original 10-bit image data using the exact same process as the final scan will use, they accurately predict the final image.

Once the user has enhanced the image to a desired level, a signal is sent from the computer 70 to perform a final scan of the image. The final scan may be at a low resolution or may be at a high resolution. In the preferred embodiment, the final scan may be up to twenty-seven hundred dots per inch for a 35 mm original.

In the same manner as previously described, the scanned image data from the final scan is passed through the system on its way to the computer 70. One difference being that the image passes through the enhancement DSP 66 and is processed using the parameters determined for the low resolution scan. The final scan, therefore, is displayed onto the monitor of the computer 70 with all of the user's enhancements in place.

The user can then include the image in an electronic document, store the image for future use, further edit the image, or print the image on a printer (not shown) in any of many known ways such as according to an electrophotographic process onto a film plane.

By using the preview buffer 62 to feed ten bit raw data to the enhancement DSP 66 after each change to the image, the image enhancement cycle is shortened since no "undo" needs to be done to recover original data and, of course, the subject does not need to be re-scanned. Adjustments can be tried and experimented with, with no accumulated loss of precision from repeated processing. Also, the ten bits of information ensures precision of calculations while the interface 68 speeds updates for display to the user.

The invention may be embodied in other specific forms without departing from the spirit and essential characteristics thereof. The present embodiments are therefore to be considered in all respects as illustrative and not restrictive, the scope of the invention being indicated by the appended claims rather than the foregoing description.

I claim:

1. An apparatus used in combination with a computer for allowing a user of the computer to electronically enhance a color image initially recorded on a photographic medium, said apparatus comprising photoresponsive means for reading the color image from the photographic medium in a first precision and providing image data representative of the color image;

buffer means for storing the image data;

image enhancing means having programmable image enhancing parameters for reading the image data from the buffer means and for processing the image data according to the programmable image enhancing parameters to create a processed image having a second precision that is less than the first precision; and computer interface means for displaying the processed image to the user such that the user can alter the processed image by selectively changing the programmable image enhancing parameters to form revised programmable image enhancing parameters which, after each such change, are transmitted back through the computer interface means to the image enhancing means where the programmable image enhancing parameters are replaced by the revised programmable image enhancing parameters and subsequently a new processed image is transmitted to the user interface means thus defining an image enhancing cycle.

2. An electronic scanning system for reading an image from a photographic medium into a computer to allow a user to manipulate the image, said electronic scanning system comprising a scanner having an optically responsive component for inputting the image and translating the image into image data having a first precision which are then processed to conform to preset color and sharpness parameters to form processed image data having a second precision that is less than the first precision;

a computer in electrical communication with the scanner for receiving the processed image data, the computer having a monitor for displaying the processed data and having input devices to allow the user to alter color and sharpness parameters; and, if so altered, altered color and sharpness variables are downloaded to the scanner to replace the preset color and sharpness parameters causing the image data to again be processed within the scanner using the altered color and sharpness parameters, updated image data are then received from the scanner which is displayed on the monitor thus completing an image enhancing cycle.

3. A method for allowing a user of a computer to electronically enhance a color image scanned from a photographic medium by a scanner comprising steps of reading the color image into the scanner from the photographic medium at a first precision and providing image data representative of the color image;

processing the image data according to programmable image enhancing parameters to create a processed image having a second precision less than the first precision; and displaying the processed image by the computer to the user such that the user can selectively alter the processed image by changing the programmable image enhancing parameters to form new programmable image enhancing parameters, and after each such change scanner to cause an update to the processed image.

* * * * *